(12) United States Patent
Sharma et al.

(10) Patent No.: US 6,275,862 B1
(45) Date of Patent: Aug. 14, 2001

(54) AUTOMATIC CATEGORIZATION OF BOOKMARKS IN A WEB BROWSER

(75) Inventors: Nandini Sharma; Neelakantan Sundaresan, both of San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/225,958

(22) Filed: Jan. 6, 1999

(51) Int. Cl.[7] ................................................ G06F 17/30
(52) U.S. Cl. ........................... 709/245; 707/10; 345/357
(58) Field of Search ..................................... 709/203, 218, 709/245, 217, 219; 707/10; 345/357

(56) References Cited

U.S. PATENT DOCUMENTS

| | | | |
|---|---|---|---|
| 5,813,007 | * | 9/1998 | Nielson ................................... 707/10 |
| 6,037,934 | * | 3/2000 | Himmel et al. ....................... 345/335 |
| 6,041,360 | * | 3/2000 | Himmel et al. ....................... 709/245 |
| 6,100,890 | * | 8/2000 | Bates et al. ........................... 345/357 |

OTHER PUBLICATIONS

"WebExtra . . . Hypercharge the WebExplorer™ ", (http://www.aescon.com/innoval/webextra/), 1996, 1pp.

"Advertising–Flying Toolbars: A Useful Netscape Navigator Add–on", Advertising WARE, (http://www.webcom.com/flyingtb/advert.html), 2pp and source code pp. 1–4, Sep. 9, 1997.

"EEE Toolbox: MultiFile Bookmark Publisher", UCI Electronic Educational Environment (http:/ / eee.uci.edu/toolbox/markemark2.html), revised Apr. 1, 1998, 2pp.

"Smart Bookmarks", PC Magazine—The 1997 Utility Guide (Smart Bookmarks), (http://ww8.zdnet.com/pcmag/features/utility/offbrwsr/uob7.htm), First Floor Inc., Yvonne, Koulouthros, 2pp. and source code pp. 1–11, Jul. 1, 1997.

Udi Manber, "Creating a Personal Web Notebook", USENIX Association, USENIX Symposium on Internet Technologies and Systems, Dec. 8–11, 1997, pp. 183–191.

* cited by examiner

Primary Examiner—Kenneth R. Coulter
(74) Attorney, Agent, or Firm—Gates & Cooper LLP

(57) ABSTRACT

A web browser that automatically categorizes bookmarks. When a page to be bookmarked is identified, the web browser compares a property of the identified page with properties of pages already saved as bookmarks. If the web browser finds another page which is a bookmark that is "similar" to the identified page, it adds the URL of the identified page as a bookmark. On the other hand, if the URLs for the two pages are exactly the same, the URL of the identified page is not added as a bookmark. Similarity may be defined as commonality in some portion of the URLs for the pages or commonality in textual information associated with the pages.

66 Claims, 3 Drawing Sheets

AUTOMATIC CATEGORIZATION OF BOOKMARKS IN A WEB BROWSER

BACKGROUND OF THE INVENTION

1. Field of the Invention

This invention relates in general to web browsers, and more particularly, to a web browser that automatically categorizes bookmarks.

2. Description of Related Art

Bookmarks provide a popular way of identifying frequently visited web sites or pages. All browsers provide facilities (e.g., "Favorites") for creating folders and subfolders that store bookmarks. Of course, bookmarks must be created and organized manually by the user.

Often, the user keeps multiple bookmarks to pages served from the same web sites. An example of this is a stock broker site, wherein the user keeps bookmarks for a "quotes" page, a "trading" page, a "holdings" page, a "stock news" page, and so on.

However, these prior art browsers do not automatically create bookmarks. Moreover, these prior art browsers do not have any mechanism for automatically categorizing various bookmarks based on some commonality.

There are some facilities that do enhance the use of bookmarks, however. For example, the WebExtra web site, located at the uniform resource locator (URL) http://www.aescon.com/innoval/webextra/, has a facility to create bookmarks by category. However, the bookmark categories have to be manually created. The same is true in the Netscape Navigator and Internet Explorer web browsers.

In another example, the Flying Toolbars ("AdvertisingWARE") web site, located at the URL http://www.webcom.com/flyingtb/advert.html, has a facility for automatically inserting bookmarks of interest into a menu item on the browser.

In yet another example, the MakeMark web site, located at the URL http://eee.uci.edu/toolbox/makemark2.html, has a facility to compress and archive bookmarks hierarchically and automatically. However, it does not have any facility for automatic categorization.

Still another example is the Smart Bookmarks web site, located at the URL http://www.software.net/PKSN023426/prod.htm, provides a facility for personal web-based notification and delivery of web sites that are of interest to the user and that have changed, but it too does not have a facility to automatically categorize bookmarks.

Another example is the publication entitled "Personalizing the Web" by Udi Manber (Usenix December 1997 Symposium on Internet technologies), which describes a technique wherein the user can select specific sites of interest and create a web page of the sites he/she likes by dragging and dropping a page retrieved from the web site.

It can be seen, then, that there is a need in the art for a web browser that applies intelligence to the creation and management of bookmarks. Specifically, there is a need for browsers that automatically create and categorize bookmarks.

SUMMARY OF THE INVENTION

To minimize the limitations in the prior art described above, and to minimize other limitations that will become apparent upon reading and understanding the present specification, the present invention discloses a method, apparatus, and article of manufacture for automatically categorizing bookmarks in a web browser. When a page to be bookmarked is identified, the web browser compares a property of the identified page with properties of pages already saved in one or more bookmark groups or subgroups. If the web browser finds another page in a bookmark group that is "similar" to the identified page, it adds the URL of the identified page to the bookmark group. On the other hand, if the URLs for the two pages are exactly the same, the URL of the identified page is not added to the bookmark group. Similarity may be defined as commonality in some portion of the URLs for the pages or commonality in textual information associated with the pages.

An object of the present invention is to enhance the delivery of Web content to the user. Another object is to provide mechanisms for more efficiently organizing Web pages for the user.

A feature of the present invention is that it can be realized on many current commercial web browser products with relatively low cost, because it can be implemented with well-structured extensions to existing software. Another feature of the present invention is that none of the other existing software systems have to be changed to implement the present invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Overview

The present invention comprises a web browser that automatically categorizes bookmarks. When a page to be bookmarked is identified, the web browser compares a property of the identified page with properties of pages already saved as bookmarks, for example, in one or more bookmark groups or subgroups. If the web browser finds another bookmarked page that is "similar" to the identified page, it adds the URL of the identified page as a bookmark. Further, the web browser may create a bookmark group or sub-group to store the similar pages together. Similarity may be defined as commonality in some portion of the URLs for the pages or commonality in textual information associated with the pages. On the other hand, if the URLs for the two pages are exactly the same, the URL of the identified page is not added as a bookmark.

Hardware Environment

Figure 1:
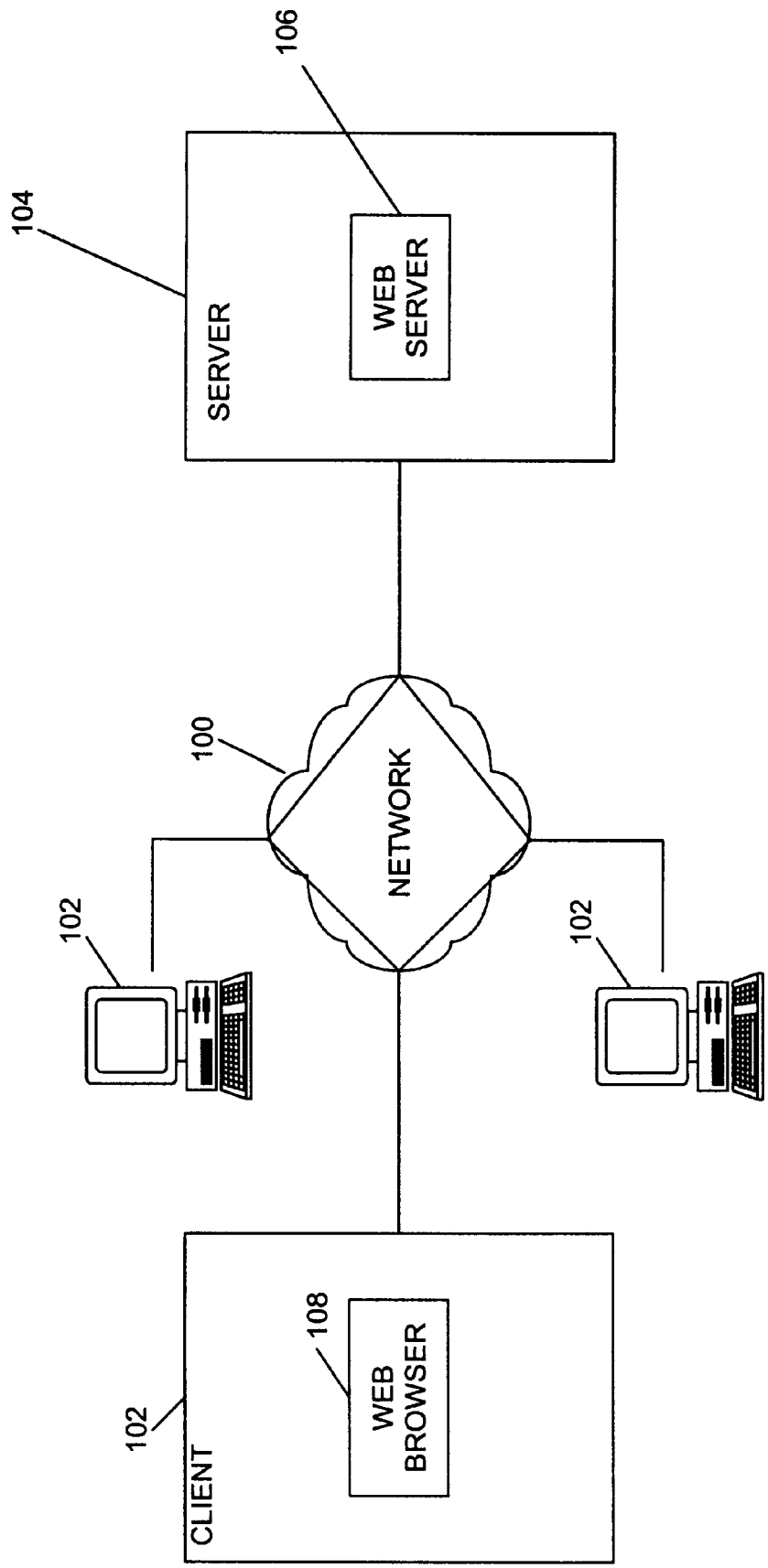
FIG. 1 is a block diagram of an exemplary hardware environment of the preferred embodiment of the present invention.

FIG. 1 is a block diagram of an exemplary hardware environment of the preferred embodiment of the present invention, and more particularly, illustrates a typical distributed computer system, wherein a network 100 connects client computers 102 to server computers 104. The network 100 preferably comprises the Internet, although it could also comprise intranets, extranets, LANs, WANs, SNA networks, etc. A typical combination of resources may include client computers 102 that are personal computers or workstations, and server computers 104 that are personal computers, workstations, minicomputers, and/or mainframes.

Each of the computers generally include, inter alia, a processor, random access memory (RAM), data storage devices, data communications devices, monitors, input devices, etc. Of course, those skilled in the art will recognize that any combination of the above components, or any number of different components, peripherals, and other devices, may be used in the present invention.

In the present invention, the server computer 104 executes a web server 106, and the client computer 102 executes a web browser 108. The web server 106 is typically a computer program such as IBM's HTTP daemon or other World Wide Web (WWW) daemon, and the web browser 108 is typically a computer program such as IBM's Web Explorer™, Netscape's Navigator™, Microsoft's Internet Explorer™, etc.

The present invention is usually implemented in the web browser 108. Generally, the web browser 108 is comprised instructions and/or data which, when read, executed, and/or interpreted by the client computer 102, causes the client computer 102 to perform the steps necessary to implement and/or use the present invention. The web browser 108 is usually embodied in and/or readable from a device, carrier, or media, such as a memory, data storage device, and/or a remote device coupled to the computer via a data communications device.

Thus, the present invention may be implemented as a method, apparatus, or article of manufacture using standard programming and/or engineering techniques to produce software, firmware, hardware, or any combination thereof The term "article of manufacture" (or alternatively, "computer program product") as used herein is intended to encompass instructions and/or data accessible from any device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Operation Of The Web Browser

In the preferred embodiment of the present invention, an improved web browser 108 automatically categorizes bookmarks by examining properties of pages for possible inclusion into a bookmark group. The properties of a new page are compared with the properties of previously bookmarked pages, and if similarities exist, the new page is added as a bookmark, so long as it is not a duplicate of a page already bookmarked and potentially subject to confirmation by the user. In a preferred embodiment, the properties used in the comparison are the pages' URLs (in a string-based approach) or textual information associated with the pages (in a concept-based approach), although other properties may be used as well. "Similarities" may be defined as commonality in some portion of the URLs for the pages in the string-based approach or commonality in textual information associated with the pages in the concept-based approach.

String-Based Approach To Commonality

In the string-based approach to commonality, two pages are considered to be "similar", if they have some commonality in their respective URLs, but not identity. For example, a URL has four parts: protocol name, host name, file name, and a "ref" part. Two URLs can be considered to be "similar", if they refer to the same host name. These two URLs can be placed into the same bookmark group.

Bookmarks also can be hierarchically grouped in groups and sub-groups. For example, all URLs with the same host name can be grouped together. If there is more than one URL in this group that has the same file name prefix, then these URLs with the common file name prefix can be grouped into the same sub-group.

The file name separators ('/') can be used for hierarchically organizing the bookmark groups and sub-groups. Creating a hierarchy makes sense only if there are more than a few elements at any level. Unnecessarily creating too many hierarchical levels can result in an unwieldy structure.

Concept-Based Approach To Commonality

Pages can also be automatically grouped together based on similar "concepts". For example, a user may wish to have all pages that refer to "java" belonging to the same bookmark group or sub-group. This works in simple situations, but may be difficult in complex situations.

For example, this grouping may result in pages describing "java" coffee and "java" programming language being grouped together in the same bookmark group. For simple situations, though, it may still make sense to automatically group such pages. In such situations, the web browser 108 can also provide hints to the user as to which bookmark group should include these pages.

For example, if the user retrieves a page that describes "java—the coffee" and wants to place the page in a bookmark group, the web browser 108 checks this page against the currently existing set of bookmark groups. It may find the group containing "java—the programming language" and ask the user if he/she would like to add the newly identified page to this group. It is up to the user to make this decision, or create a new bookmark group, or select another bookmark group, and command the web browser 108 appropriately.

In one embodiment of the concept-based approach, the URL of a page is added to a bookmark group or sub-group based on the comments that surround or are embedded in an HTTP (HyperText Transport Protocol) anchor reference containing the URL. An HTTP anchor reference would typically be formatted as follows: "<A HREF=http://{host-name}/{file-name}/{ref-part}>{textual information}</A>", wherein "{host-name}" identifies the Web server, "{file-name}" identifies a file name to be retrieved from the web server, and "{ref-part}" identifies a reference part of the file being retrieved. Note that it is possible to include textual information about the page in the anchor reference, wherein the textual information can be used to categorize the URL in a bookmark group.

For example, the anchor reference may comprise: <A HREF=http://www.javasoft.com>Sun's Java Site</A>, wherein "Sun's Java Site" comprises the textual information used by the web browser 108 to categorize the URL. The web browser 108 may search the bookmark groups for other pages that are associated with the keywords "Sun", "Java", etc., or some combinations thereof. The web browser 108 may display the bookmark groups associated with these pages, and ask the user to add the identified page to one of these groups.

In another embodiment of the concept-based approach, the URL of a page is added as a bookmark based on the textual information in a TITLE tag (or other tag) embedded in a page identified by the URL. The textual information in a TITLE tag generally contains a good description of the page.

In yet another embodiment of the concept-based approach, data mining and classification techniques could be used to categorize a bookmark. Note that it is possible to generate such information about the pages and/or bookmark groups in a number of different ways using these techniques.

Choosing Between String-Based Vs. Concept-Based Approaches

The choice between the string-based or concept-based approaches may be made by the web browser 108 automatically or in response to a command entered by the user. The web browser 108 might first try the string-based approach and when the page cannot be associated with a bookmark group using this approach, the web browser 108 might apply the concept-based approach. Alternatively, the web browser 108 might give higher priority to the concept-based approach and only when that fails would it try the string-based approach. The web browser 108 may also allow the user to pick one approach over the other by selecting a function or specifying some parameters.

Logic Of The Web Browser

Figure 2:
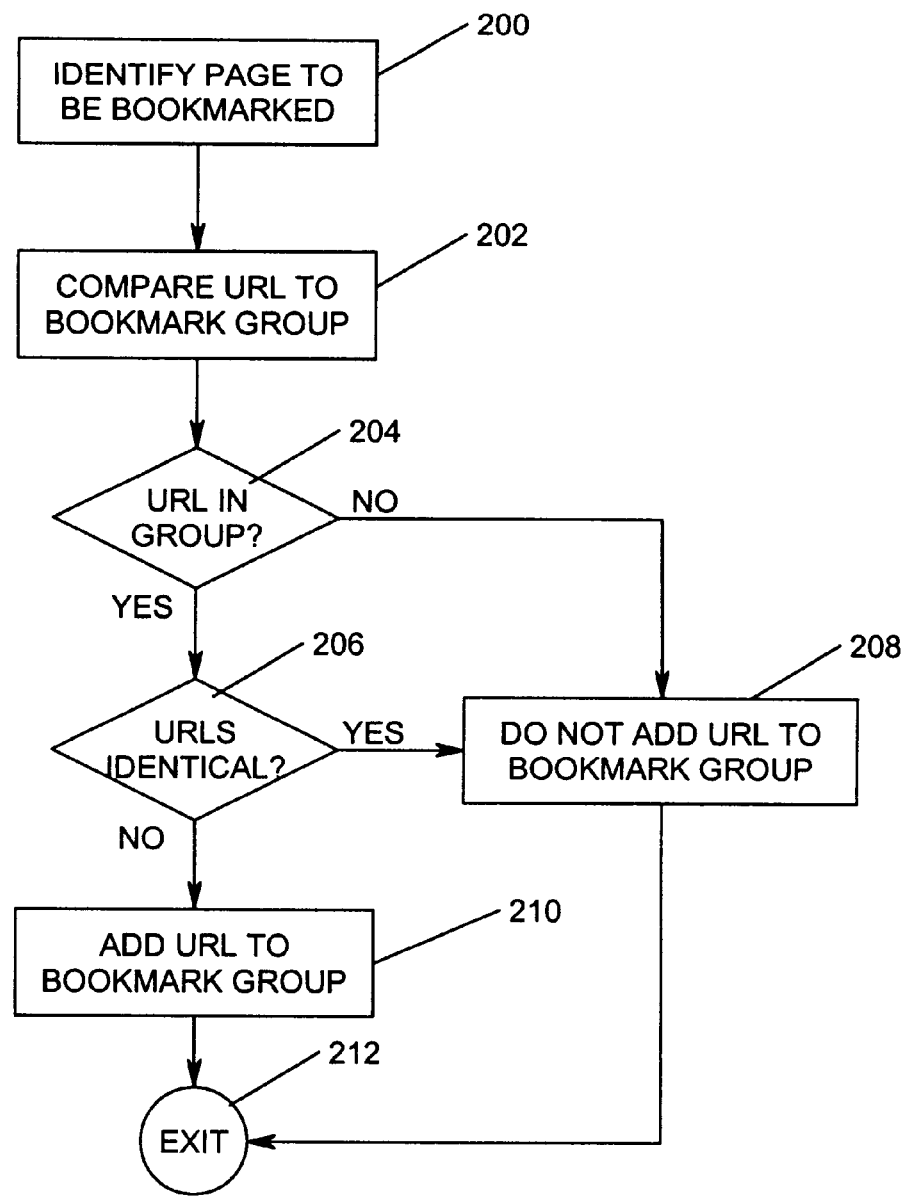
FIG. 2 is a flowchart illustrating the logic performed by web browser for the string-based approach according to the preferred embodiment of the present invention.
Figure 3:
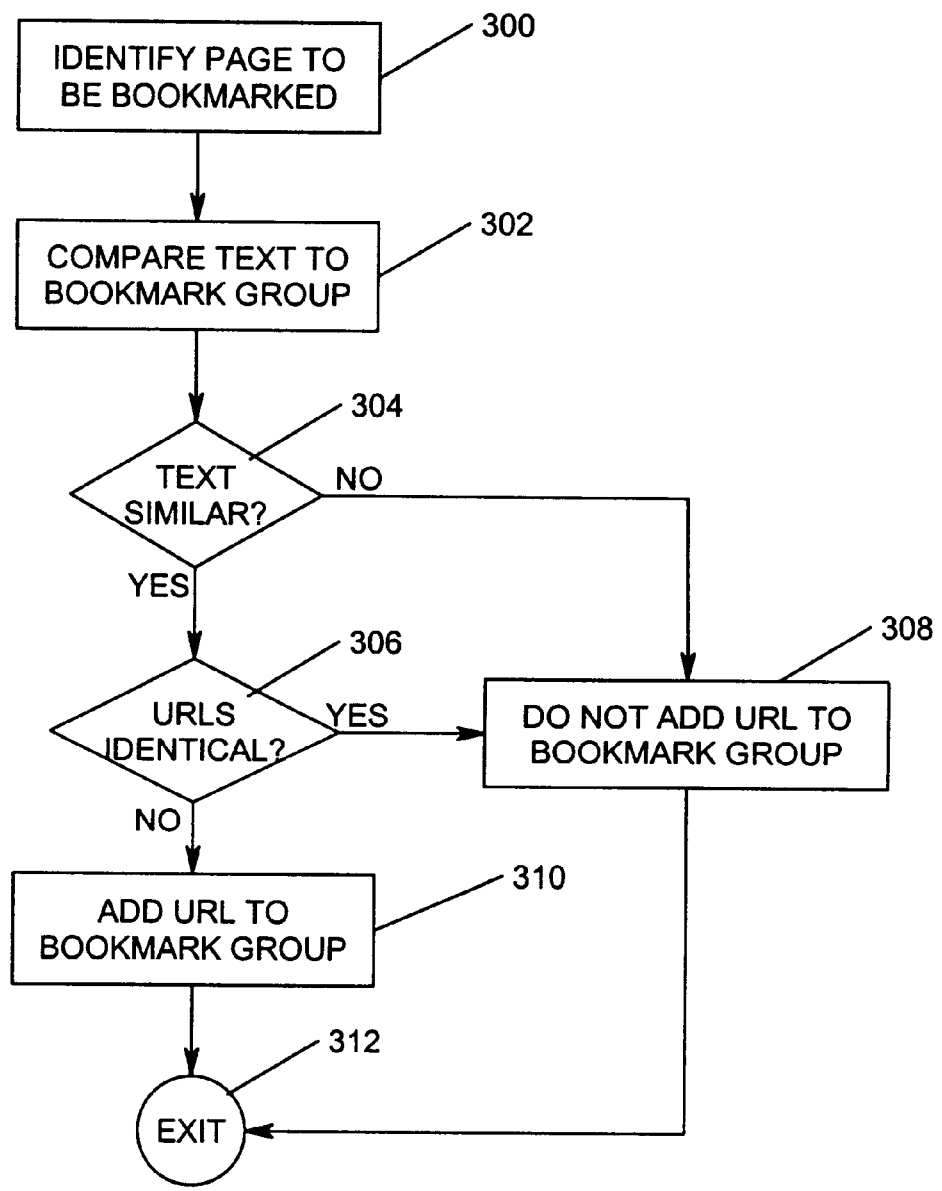
FIG. 3 is a flowchart illustrating the logic performed by web browser for the concept-based approach according to the preferred embodiment of the present invention.

FIG. 2 is a flowchart illustrating the logic performed by web browser 108 for the string-based approach according to the preferred embodiment of the present invention, and FIG. 3 is a flowchart illustrating the logic performed by web browser 108 for the concept-based approach according to the preferred embodiment of the present invention.

Referring to FIG. 2, Block 200 represents the web browser 108 identifying the page to be bookmarked. This may occur in any number of different ways. For example, it may be performed for every page displayed by the browser 108, it may be performed in response to a command entered by the user, it may occur when the user clicks on a hyperlink on a page, etc.

Block 202 represents the web browser 108 comparing the URL to the URLs in the various bookmark groups.

Block 204 is a decision block that represents the web browser 108 determining whether the URL matches some portion of a URL already stored in one of the bookmark groups. If so, control transfers to Block 206; otherwise, control transfers to Block 208.

Block 206 is a decision block that represents the web browser 108 determining whether the URL is identical to a URL already stored in one of the bookmark groups. If so, control transfers to Block 208; otherwise, control transfers to Block 210.

Block 208 represents the web browser 108 not adding the URL to the bookmark group. Thereafter, control transfers to Block 212.

Block 210 represents the web browser 108 adding the URL to the bookmark group. Thereafter, control transfers to Block 212.

Block 212 represents the end of the logic for FIG. 2.

Referring to FIG. 3, Block 300 represents the web browser 108 identifying the page to be bookmarked.

Block 302 represents the web browser 108 comparing the textual information associated with the identified page to the textual information for other pages already stored in the bookmark groups.

Block 304 is a decision block that represents the web browser 108 determining whether the textual information is similar to the textual information found in one of the bookmark groups. If so, control transfers to Block 306; otherwise, control transfers to Block 308. This Block may include the web browser 108 displaying a set of possible bookmark groups and the similar textual information, so that the user can manually decide whether to add the URL to a selected bookmark group.

Block 306 is a decision block that represents the web browser 108 determining whether the URL is identical to a URL already stored in one of the bookmark groups. If so, control transfers to Block 308; otherwise, control transfers to Block 310.

Block 308 represents the web browser 108 not adding the URL to the bookmark group. Thereafter, control transfers to Block 312.

Block 310 represents the web browser 108 adding the URL to the bookmark group. Thereafter, control transfers to Block 312.

Block 312 represents the end of the logic for FIG. 3.

CONCLUSION

This concludes the description of the preferred embodiment of the invention. The following describes some alternative embodiments for accomplishing the present invention.

For example, those skilled in the art will recognize that any type of computer configuration and/or network configuration could benefit from the present invention. Those skilled in the art will also recognize that many types of software, including web browsers and other programs, could benefit from the present invention. In addition, those skilled in the art will also recognize that the functions described herein could be implemented and/or invoked in many different ways.

In summary, the present invention discloses a method, apparatus, and article of manufacture for automatically categorizing bookmarks in a web browser. When a page to be bookmarked is identified, the web browser compares a property of the identified page with properties of pages already saved in one or more bookmark groups or subgroups. If the web browser finds another page in a bookmark group that is "similar" to the identified page, it adds the URL of the identified page to the bookmark group. On the other hand, if the URLs for the two pages are exactly the same, the URL of the identified page is not added to the bookmark group. Similarity may be defined as commonality in some portion of the URLs for the pages or commonality in textual information associated with the pages.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of browsing a network, comprising:
   (a) identifying a page to be displayed by a browser executed by a computer;
   (b) comparing a property of the identified page to properties of at least one other page stored as a bookmark by the browser, wherein the properties are determined by the browser; and
   (c) saving the property of the identified page as a bookmark when the comparing step indicates a similarity between the property of the identified page and a property of one or more of the other pages stored as a bookmark.

2. The method of claim 1, wherein the identifying comprises identifying the page in response to a user-entered command.

3. The method of claim 2, wherein the user-entered command comprises a selection of a hyperlink.

4. The method of claim 2, wherein the user-entered command comprises a specification of a uniform resource locator (URL).

5. The method of claim 1, wherein the property comprises a uniform resource locator (URL) for the page.

6. The method of claim 5, wherein the similarity comprises a commonality in URLs for the pages.

7. The method of claim 6, wherein the commonality in the URLs comprises a common prefix in the URLs.

8. The method of claim 6, wherein the commonality in the URLs comprises a common host name in the URLs.

9. The method of claim 6, wherein the commonality in the URLs comprises a common file name in the URLs.

10. The method of claim 1, wherein the property comprises textual information associated with the page.

11. The method of claim 10, wherein the similarity comprises a commonality in the textual information associated with the pages.

12. The method of claim 10, wherein the textual information identifies concepts associated with the pages.

13. The method of claim 10, wherein the textual information is embedded in an anchor reference associated with the identified page.

14. The method of claim 10, wherein the textual information comprises one or more keywords.

15. The method of claim 1, wherein the saving comprises hierarchically grouping the pages.

16. The method of claim 15, wherein the hierarchically grouping comprises at least one group.

17. The method of claim 16, wherein the hierarchically grouping comprises at least one sub-group of a group.

18. The method of claim 15, wherein the hierarchically grouping comprises hierarchically organizing the pages according to a common prefix in their respective uniform resource locators (URLs).

19. The method of claim 15, wherein the hierarchically grouping comprises hierarchically organizing the URLs according to a file name separators therein.

20. The method of claim 1, wherein the comparing comprises comparing a uniform resource locator (URL) for the identified page to other URLs stored by the browser using a string-based approach.

21. The method of claim 1, wherein the comparing comprises comparing a uniform resource locator (URL) for the identified page to at least one other URL stored by the browser using a concept-based approach.

22. The method of claim 1, wherein the comparing comprises comparing a uniform resource locator (URL) for the identified page to at least one other URL stored by the browser using both a string-based approach and a concept-based approach.

23. An apparatus for browsing a network, comprising:
   (a) a client computer connected to the network; and
   (b) a browser, executed by the client computer, for identifying a page to be displayed by a browser executed by a computer; for comparing a property of the identified page to properties of at least one other page stored as a bookmark by the browser, wherein the properties are determined by the browser; and for saving the property of the identified page as a bookmark when the comparing step indicates a similarity between the property of the identified page and a property of one or more of the other pages stored as bookmarks.

24. The apparatus of claim 23, wherein the browser further comprises means for identifying the page in response to a user-entered command.

25. The apparatus of claim 24, wherein the user-entered command comprises a selection of a hyperlink.

26. The apparatus of claim 24, wherein the user-entered command comprises a specification of a uniform resource locator (URL).

27. The apparatus of claim 23, wherein the property comprises a uniform resource locator (URL) for the page.

28. The apparatus of claim 27, wherein the similarity comprises a commonality in URLs for the pages.

29. The apparatus of claim 28, wherein the commonality in the URLs comprises a common prefix in the URLs.

30. The apparatus of claim 28, wherein the commonality in the URLs comprises a common host name in the URLs.

31. The apparatus of claim 28, wherein the commonality in the URLs comprises a common file name in the URLs.

32. The apparatus of claim 23, wherein the property comprises textual information associated with the page.

33. The apparatus of claim 32, wherein the similarity comprises a commonality in the textual information associated with the pages.

34. The apparatus of claim 32, wherein the textual information identifies concepts associated with the pages.

35. The apparatus of claim 32, wherein the textual information is embedded in an anchor reference associated with the identified page.

36. The apparatus of claim 32, wherein the textual information comprises one or more keywords.

37. The apparatus of claim 23, wherein the browser further comprises means for hierarchically grouping the pages.

38. The apparatus of claim 37, wherein the hierarchically grouping comprises at least one group.

39. The apparatus of claim 37, wherein the hierarchically grouping comprises at least one subgroup of a group.

40. The apparatus of claim 37, wherein the hierarchically grouping comprises means for hierarchically organizing the pages according to a common prefix in their respective uniform resource locators (URLs).

41. The apparatus of claim 37, wherein the hierarchically grouping comprises means for hierarchically organizing the URLs according to a file name separators therein.

42. The apparatus of claim 23, wherein the browser further comprises means for comparing a uniform resource locator (URL) for the identified page to at least one other URL stored by the browser using a string-based approach.

43. The apparatus of claim 23, wherein the browser further comprises means for comparing a uniform resource locator (URL) for the identified page to at least one other URL stored by the browser using a concept-based approach.

44. The apparatus of claim 23, wherein the browser further comprises means for comparing a uniform resource locator (URL) for the identified page to art least one other URL stored by the browser using both a string-based approach and a concept-based approach.

45. An article of manufacture embodying logic for performing a method for browsing on a network, the method comprising:
   (a) identifying a page to be displayed by a browser executed by a computer;
   (b) comparing a property of the identified page to properties of at least one other page stored as a bookmark by the browser, wherein the properties are determined by the browser; and
   (c) saving the property of the identified page as a bookmark when the comparing step indicates a similarity between the property of the identified page and a property of one or more of the other pages stored as bookmarks.

46. The method of claim 45, wherein the identifying comprises identify the page in response to a user-entered command.

47. The method of claim 46, wherein the user-entered command comprises a selection of a hyperlink.

48. The method of claim 46, wherein the user-entered command comprises a specification of a uniform resource locator (URL).

49. The method of claim 45, wherein the property comprises a uniform resource locator (URL) for the page.

50. The method of claim 45, wherein the similarity comprises a commonality in URLs for the pages.

51. The method of claim 50, wherein the commonality in the URLs comprises a common prefix in the URLs.

52. The method of claim 50, wherein the commonality in the URLs comprises a common host name in the URLs.

53. The method of claim 50, wherein the commonality in the URLs comprises a common file name in the URLs.

54. The method of claim 45, wherein the property comprises textual information associated with the page.

55. The method of claim 54, wherein the similarity comprises a commonality in the textual information associated with the pages.

56. The method of claim 54, wherein the textual information identifies concepts associated with the pages.

57. The method of claim 54, wherein the textual information is embedded in an anchor reference associated with the identified page.

58. The method of claim 54, wherein the textual information comprises one or more keywords.

59. The method of claim 45, wherein the saving comprises hierarchically grouping the pages.

60. The method of claim 59, wherein the hierarchically grouping comprises at least one group.

61. The method of claim 59, wherein the hierarchically grouping comprises at least one sub-group of a group.

62. The method of claim 59, wherein the hierarchically grouping comprises hierarchically organizing the pages according to a common prefix in their respective uniform resource locators (URLs).

63. The method of claim 59, wherein the hierarchically grouping comprises hierarchically organizing the URLs according to a file name separators therein.

64. The method of claim 45, wherein the comparing comprises comparing a uniform resource locator (URL) for the identified page to at least one other URL stored by the browser using a string-based approach.

65. The method of claim 45, wherein the comparing comprises comparing a uniform resource locator (URL) for the identified page to at least one other URL stored by the browser using a concept-based approach.

66. The method of claim 45, wherein the comparing comprises comparing a uniform resource locator (URL) for the identified page to at least one other URL stored by the browser using both a string-based approach and a concept-based approach.

* * * * *